United States Patent
Winter

(10) Patent No.: US 10,369,933 B2
(45) Date of Patent: Aug. 6, 2019

(54) STORAGE RACK FOR AUTONOMOUS ALL-TERRAIN VEHICLE

(71) Applicant: Honda Motor Co., Ltd., Tokyo (JP)

(72) Inventor: Justin M. Winter, Mt. Victory, OH (US)

(73) Assignee: Honda Motor Co., Ltd., Tokyo (JP)

( * ) Notice: Subject to any disclaimer, the term of this patent is extended or adjusted under 35 U.S.C. 154(b) by 102 days.

(21) Appl. No.: 15/836,215

(22) Filed: Dec. 8, 2017

(65) Prior Publication Data

US 2019/0176712 A1   Jun. 13, 2019

(51) Int. Cl.
| | |
|---|---|
| *B60R 9/00* | (2006.01) |
| *G05D 1/00* | (2006.01) |
| *B60R 9/048* | (2006.01) |
| *B60R 9/04* | (2006.01) |

(52) U.S. Cl.
CPC ............. B60R 9/00 (2013.01); G05D 1/0088 (2013.01); *B60R 9/04* (2013.01); *B60R 9/048* (2013.01)

(58) Field of Classification Search
CPC ... B60R 9/048; B60R 9/04; B60R 9/00; B60P 3/40
USPC ............................................... 296/3; 224/405
See application file for complete search history.

(56) References Cited

U.S. PATENT DOCUMENTS

| | | | |
|---|---|---|---|
| 3,145,441 A | 8/1964 | Strandrud | |
| 4,266,703 A | 5/1981 | Litz | |
| 6,588,637 B2 | 7/2003 | Gates et al. | |
| 6,789,712 B2 | 9/2004 | Gates et al. | |
| 6,793,108 B2 | 9/2004 | Williams, Jr. | |
| 6,942,275 B2 | 9/2005 | Corbett | |
| 7,165,702 B1 | 1/2007 | Billberg | |
| 8,875,830 B2 | 11/2014 | Massicotte et al. | |
| 9,586,629 B2 | 3/2017 | Leitner | |
| 2002/0163214 A1* | 11/2002 | Carter | B60P 3/40 |
| | | | 296/3 |

(Continued)

FOREIGN PATENT DOCUMENTS

EP            2874037            5/2015

OTHER PUBLICATIONS

"05-15 Tacoma Pack Rack Accessory Bar", http://allproofroad.com/shop/pack-rack-accessory-bar/, printed on Sep. 11, 2017, 7 pages.

(Continued)

*Primary Examiner* — Jason S Morrow
(74) *Attorney, Agent, or Firm* — Rankin, Hill & Clark LLP

(57) ABSTRACT

An autonomous all-terrain vehicle includes a frame structure, left and right frame rails mounted to the frame structure, and a rack mounted to the frame rails. A forward frame member of the rack includes left and right forward uprights and a forward cross member. The forward uprights include forward mounts each extended inwardly in a lateral direction of the vehicle. A rear frame member of the rack includes left and right rear uprights and a rear cross member. The rear uprights include rear mounts each extended inwardly in the lateral direction. A left rail is disposed between the left uprights of the forward and rear frame members. A right rail is disposed between the right uprights of the forward and rear frame members. The forward and rear left mounts are connected to the left frame rail, and the forward and rear right mounts are connected to the right frame rail.

20 Claims, 6 Drawing Sheets

(56) References Cited

U.S. PATENT DOCUMENTS

| | | |
|---|---|---|
| 2007/0045368 A1 | 3/2007 | Lavelle |
| 2010/0243691 A1 | 9/2010 | Salisbury |
| 2011/0285162 A1* | 11/2011 | Kuklok ..................... B60R 9/00 |
| | | 296/37.6 |
| 2016/0059906 A1* | 3/2016 | Leitner .............. B62D 33/0207 |
| | | 296/3 |
| 2019/0106167 A1* | 4/2019 | Niezgoda ............. B60K 7/0007 |

OTHER PUBLICATIONS

"16+ Apex Modular Rack", http://allprooffroad.com/shop/16-apex-modular-pack-rack/, printed on Sep. 11, 2017, 7 pages.
"Pickup bed mounted rtt", https://forum.ih8mud.com/threads/pickup-bed-mounted-rtt.508257/, printed on Sep. 11, 2017, 12 pages.
"Grizzly is a Half-Robot, Half-Tractor Beast of Burden", http://www.coolthings.com/grizzly-robot-utility-vehicle/, printed on Sep. 11, 2017, 15 pages.

* cited by examiner

STORAGE RACK FOR AUTONOMOUS ALL-TERRAIN VEHICLE

BACKGROUND

There are increasing applications for autonomous vehicles, especially autonomous all-terrain vehicles that are adapted and configured to traverse unprepared terrain. The present disclosure relates to a storage rack for an autonomous all-terrain vehicle

BRIEF DESCRIPTION

According to one aspect, an autonomous all-terrain vehicle comprises a frame structure, left and right frame rails extended in a longitudinal direction of the vehicle and mounted to the frame structure, and a rack extended in the longitudinal direction and releasably mounted to the left and right frame rails. The rack includes a forward frame member and a rear frame member. The forward frame member includes left and right forward uprights and a forward cross member disposed bridgingly between the left and right forward uprights. The left and right forward uprights include respective left and right forward mounts each extended inwardly in a lateral direction of the vehicle. The rear frame member includes left and right rear uprights and a rear cross member disposed bridgingly between the left and right rear uprights. The left and right rear uprights include respective left and right rear mounts each extended inwardly in the lateral direction. At least one left rail extended in the longitudinal direction is disposed bridgingly between the left uprights of the respective forward and rear frame members. At least one right rail extended in the longitudinal direction is disposed bridgingly between the right uprights of the respective forward and rear frame members. The forward and rear left mounts are connected to the left frame rail, and the forward and rear right mounts are connected to the right frame rail.

According to another aspect, a rack is releasably mounted to left and right frame rails secured to a frame structures of an autonomous all-terrain vehicle. The rack comprises a forward frame member and a rear frame member. The forward frame member includes left and right forward uprights and a forward cross member disposed bridgingly between the left and right forward uprights. The forward frame member is defined by a pair of separate forward sub-frame members interconnected by at least one forward plate. The rear frame member includes left and right rear uprights and a rear cross member disposed bridgingly between the left and right rear uprights. The rear frame member is defined by a pair of separate rear sub-frame members interconnected by at least one rear plate. At least one left rail extended in the longitudinal direction is disposed bridgingly between the left uprights of the respective forward and rear frame members. At least one right rail extended in the longitudinal direction is disposed bridgingly between the right uprights of the respective forward and rear frame members. Left and right forward mounts are each extended inwardly in a lateral direction of the vehicle from the respective left and right forward uprights. Each of the left and right forward mounts includes a forward attachment member adapted for releasable connection to the respective left frame rail and right frame rail. Left and right rear mounts are each extended inwardly in the lateral direction from the respective left and right rear uprights. Each of the left and right rear mounts includes a rear attachment member adapted for releasable connection to the respective left frame rail and right frame rail.

According to another aspect, an autonomous all-terrain vehicle comprises a frame structure, left and right frame rails extended in a longitudinal direction of the vehicle and mounted to the frame structure, and a rack extended in the longitudinal direction and releasably mounted to the left and right frame rails, a lateral dimension of the rack being greater than a spacing between the left and right frame rails. The rack includes a forward A-shaped frame member and a rear A-shaped frame member. The forward frame member includes left and right forward mounts each extended inwardly in a lateral direction of the vehicle. The rear frame member includes left and right rear mounts each extended inwardly in the lateral direction. The rack further includes at least one left rail and at least one right rail each disposed bridgingly between the forward and rear frame members. The left frame rail includes an upper surface having apertures which receive the left forward and rear mounts, and the right frame rail includes an upper surface having apertures which receive the right forward and rear mounts.

DETAILED DESCRIPTION

It should, of course, be understood that the description and drawings herein are merely illustrative and that various modifications and changes can be made in the structures disclosed without departing from the present disclosure. As used herein, longitudinal directions refer to forward and rearward directions of vehicle travel, transverse/lateral directions are across a width of the vehicle, i.e., left and right directions, and vertical directions relate to elevation, i.e., upward and downward directions. Further, for purposes of description herein, the terms forward, rearward, rear, right, left, vertical, horizontal, and derivatives thereof shall relate to the frame structure of the vehicle as oriented in FIG. 3.

Figure 1:
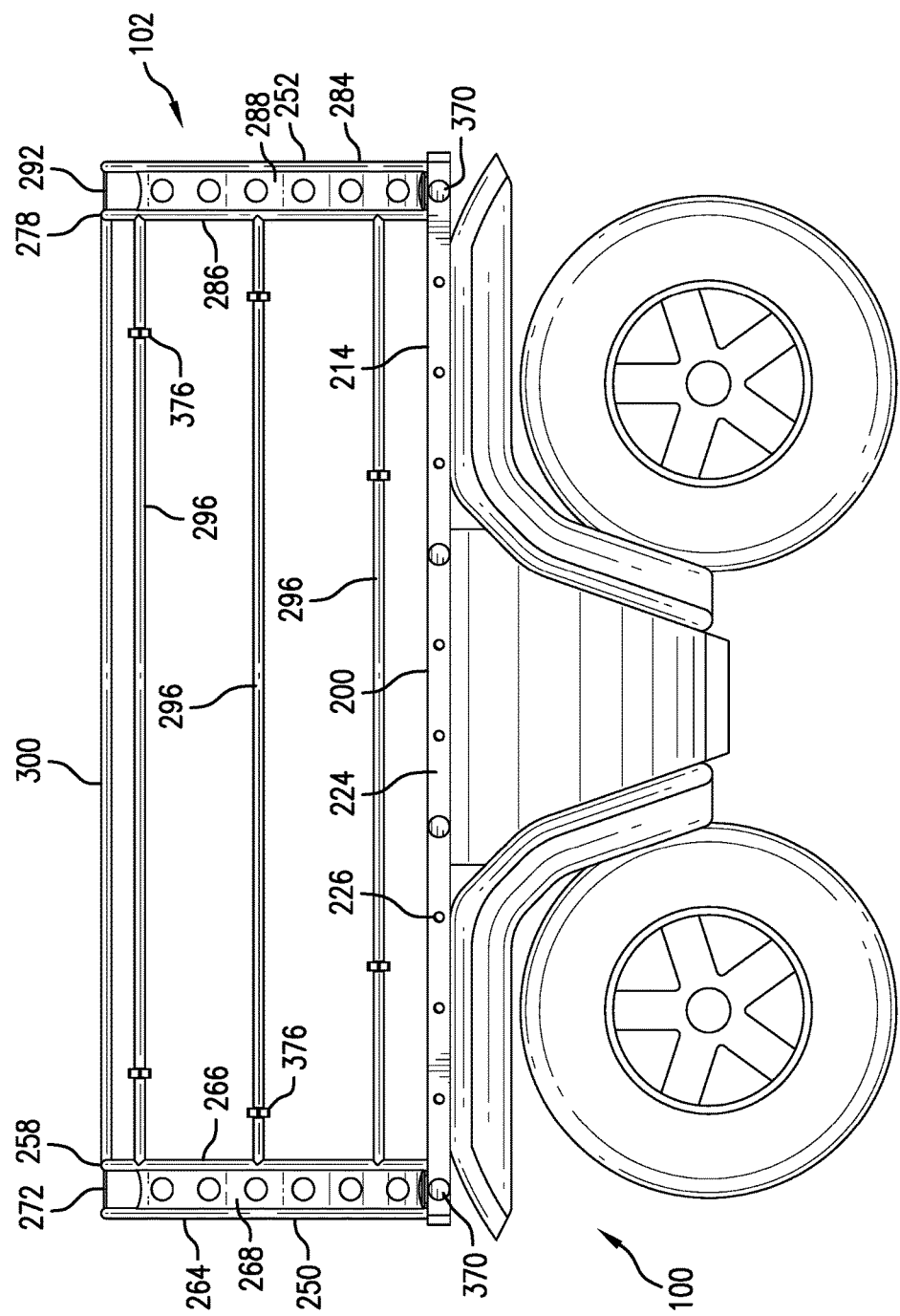
FIG. 1 is a schematic side view of an autonomous all-terrain vehicle having an exemplary rack according to the present disclosure mounted thereto.
Figure 2:
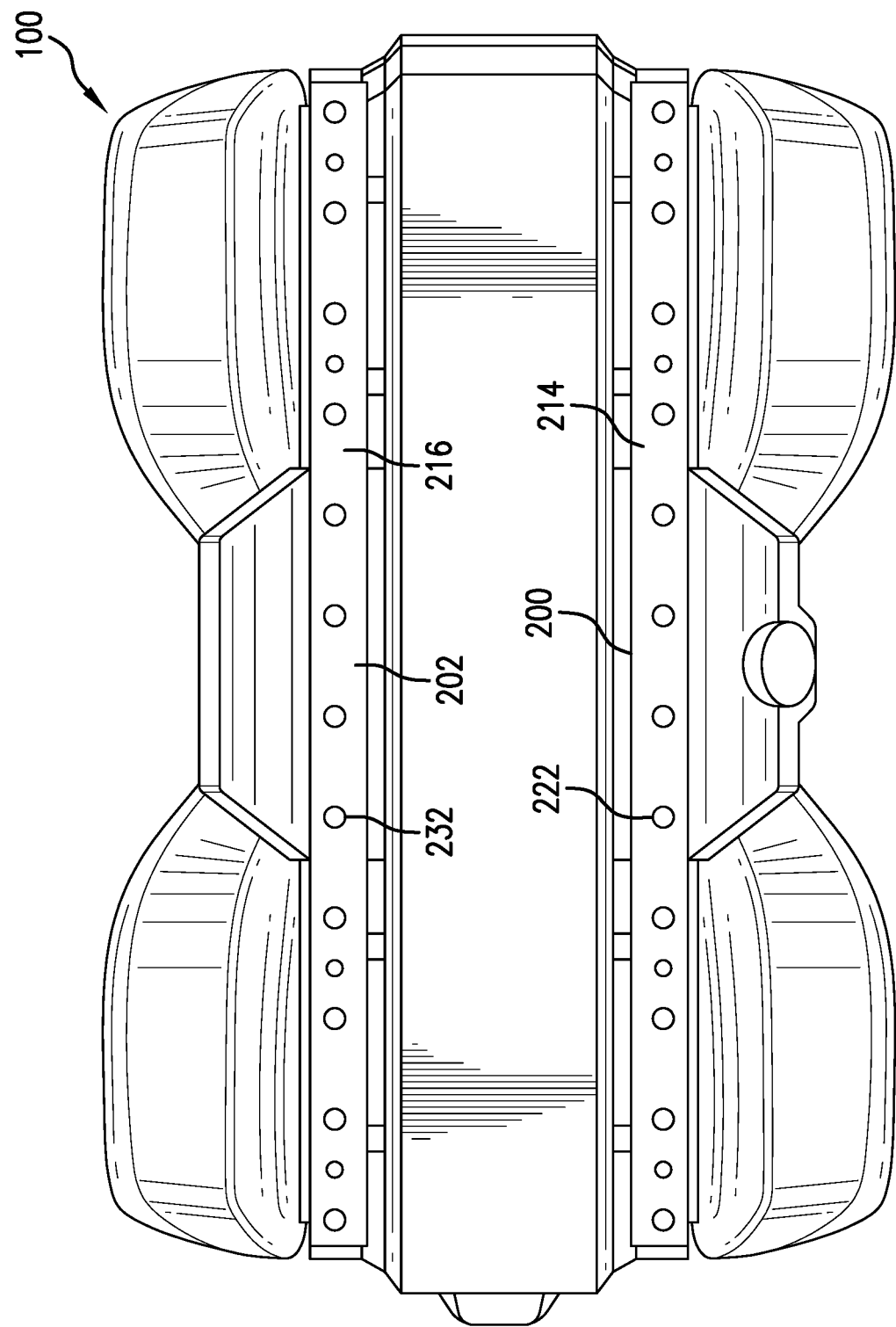
FIG. 2 is a top plan view of the vehicle sans the exemplary rack.
Figure 3:
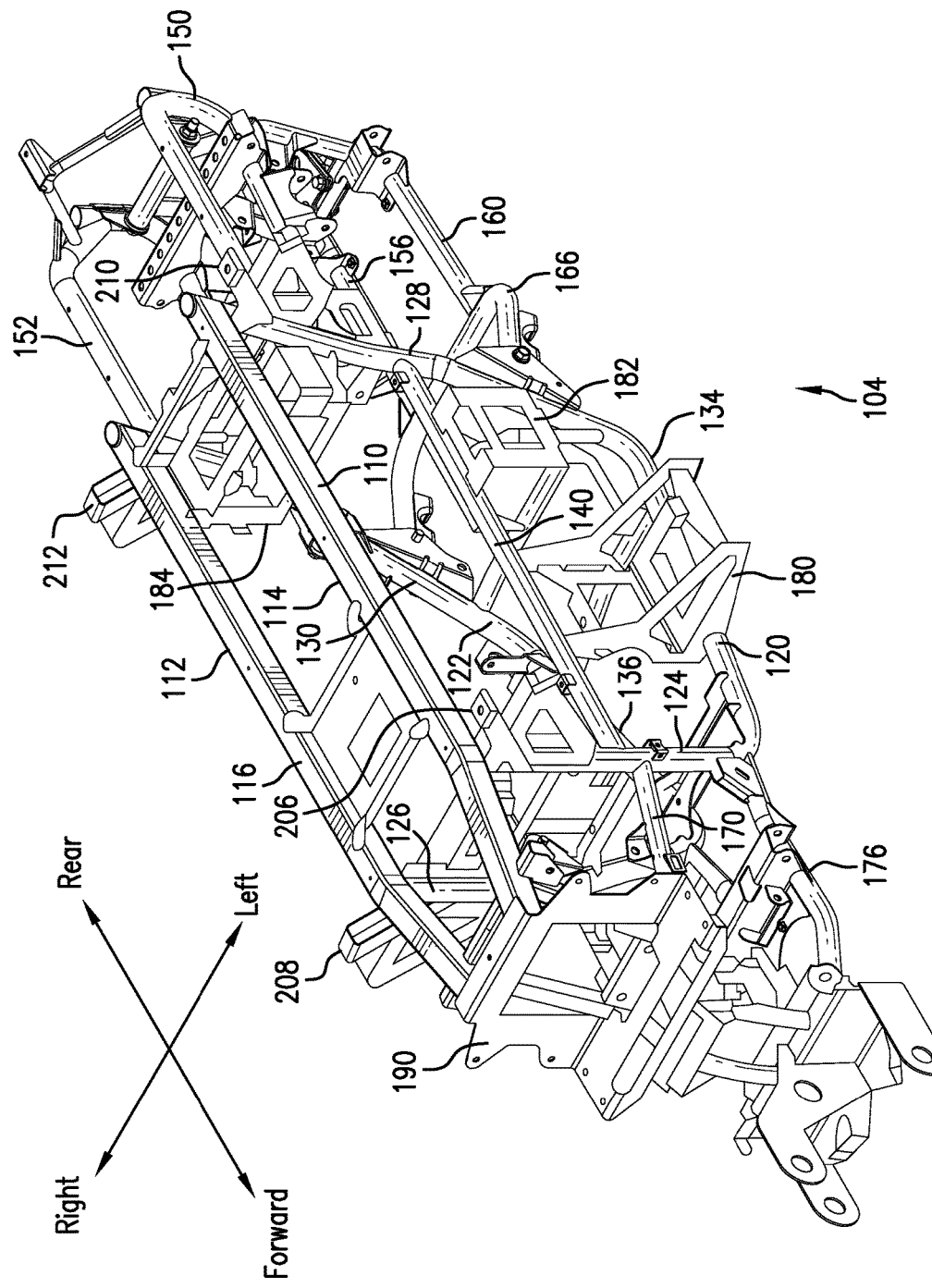
FIG. 3 is a side perspective view of a frame structure of the vehicle.
Figure 4:
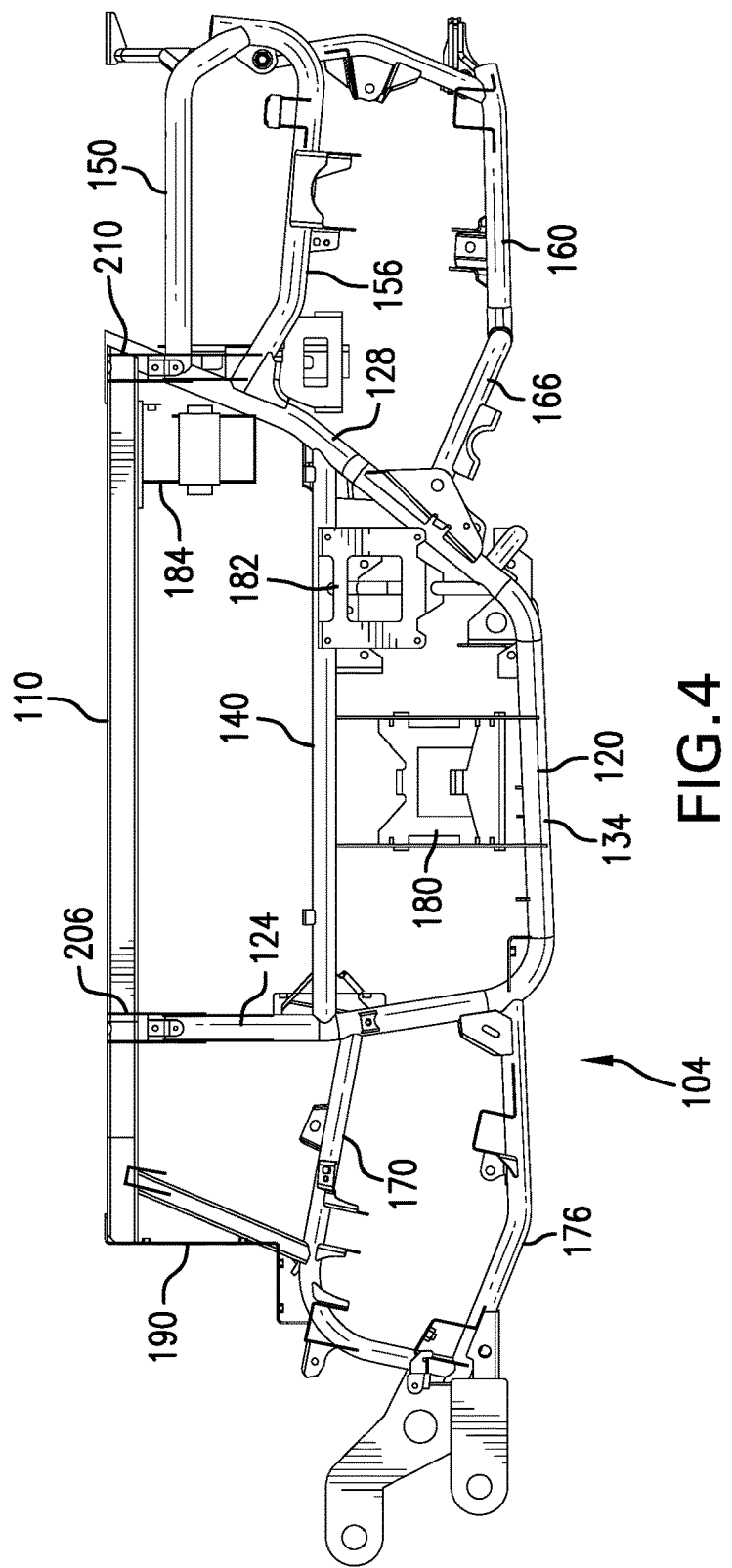
FIG. 4 is a side view of the frame structure.

Referring now to the drawings, wherein like numerals refer to like parts throughout the several views, FIGS. 1-6 schematically illustrate an autonomous all-terrain vehicle 100 having an exemplary rack 102 according to the present disclosure mounted thereto. The vehicle 100 is designed to travel off-road on a variety of terrains, including roadless rugged terrain, for recreational, utility and/or other purposes. The vehicle 100 comprises a frame structure 104 supporting a plurality of operational components for driving and maneuvering the vehicle 100, including a powertrain, a steering system, a suspension, and a braking system. These operational components are known in the art, and further discussion herein is omitted for conciseness. With reference to FIGS. 3 and 4, the frame structure 104 includes left and right laterally spaced upper main frame members 110, 112 extended in a longitudinal direction of the frame structure. Each of the left and right upper main frame members 110, 112 is horizontally disposed and has an upper mounting surface 114, 116. As shown, the left and right upper main frame members 110, 112 are rectangular shaped in cross-section taken along a lateral direction of the vehicle 100; although, this is not required. The frame structure 104 further includes left and right laterally spaced lower main frame members 120, 122 extended in the longitudinal direction of the frame structure. Each of the left and right lower main frame members 120, 122 has a first or forward portion 124, 126 and a second or rearward portion 128, 130. The forward portions 124, 126, which can be inclined forward and upwards, are mounted to the left and right upper main frame members 110, 112. The rearward portions 128, 130, which can be inclined rearward and upwards, are also mounted to the left and right upper main frame members 110, 112. The left and right lower main frame members 120, 122 further include central portions 134, 136. According to one aspect, the central portions 134, 136 are extended in a lateral direction of the frame structure 104 outward of the respective left and right upper main frame members 110, 112 in a top view of the frame structure 104. Therefore, a lateral dimension of an upper part of the frame structure 104 is narrowed compared to a lower part of the frame structure.

Further, left and right first sub-frame members (only the left first sub-frame member 140 is visible) are disposed bridgingly between and mounted to the forward portions 124, 126 and the rearward portions 128, 130 of the left and right lower main frame members 120, 122. In the illustrated embodiment, the left and right first sub-frame members are laterally aligned with the respective left and right upper main frame members 110, 112 in a top view of the frame structure 104, which further provides for a narrowed lateral dimension of the frame structure 104. With continued reference to FIGS. 3 and 4, left and right laterally spaced upper rear frame members 150, 152 are extended in the longitudinal direction rearward of the left and right main frame members 110, 112. Left and right upper rear suspension sub-frame members (only the left upper rear suspension sub-frame member 156 is visible) are disposed bridgingly between the rearward portions 128, 130 of the respective left and right lower main frame members 120, 122 and rear end portions of the respective left and right upper rear frame members. Left and right lower rear suspension sub-frame members (only the left lower rear suspension sub-frame member 160 is visible) can be mounted to a U-shaped frame member 166 connected to the rearward portions 128, 130 of the respective left and right lower main frame members 120, 122.

The exemplary frame structure 104 further includes left and right upper forward suspension sub-frame members (only the left upper forward suspension sub-frame member 170 is visible) mounted to the forward portions 124, 126 of the respective left and right lower main frame members 120, 122. Left and right lower forward suspension sub-frame members (only the left lower forward suspension sub-frame member 176 is visible) are disposed bridgingly between and mounted to downward curved forward end portions of the respective left and right upper forward suspension sub-frame members and the forward portions 124, 126 of the respective left and right lower main frame members 120, 122. Further depicted are mounting brackets 180, 182, 184 for operational components of the vehicle 100. A component mounting bracket 190 for another operational component of the vehicle (e.g., a battery generator/charger) is mounted to forward end portion of the left and right upper main frame member 110, 112.

As depicted in FIGS. 1 and 2, mounted to the frame structure 104 are left and right frame rails 200, 202 which are extended in the longitudinal direction of the frame structure 104. To mount the left and right frame rails 200, 202, according to the illustrated aspect of FIGS. 3 and 4, left and right forward platform mounting brackets 206, 208 and left and right rear platform mounting brackets 210, 212 are mounted to the frame structure 104, particularly one of the respective left and right upper main frame members 110, 112 and the respective left and right lower main frame members 120, 122. By way of example, the left and right forward platform mounting brackets 206, 208 can be mounted to the forward portions 124, 126 of the respective left and right lower main frame members 120, 122. And the left and right rear platform mounting brackets 210, 212 can be mounted to the rearward portions 128, 130 of the respective left and right lower main frame members 120, 122. The left frame rail 200 is mounted to mounting surfaces of the left forward and rear platform mounting brackets 206, 210, and the right frame rail 202 is mounted to mounting surfaces of the right forward and rear platform mounting brackets 208, 212. According to one aspect, the mounting surfaces of the respective left and right forward mounting brackets 206, 208 and the left and right rear platform mounting brackets 210, 212 are parallel to (and, for example, coplanar with) the upper mounting surfaces 114, 116 of the respective left and right upper main frame members 110, 112. In addition, the left and right frame rails 200, 202 are offset in a height direction of the frame structure 104 from the left and right upper main frame members 110, 112.

Figure 5:
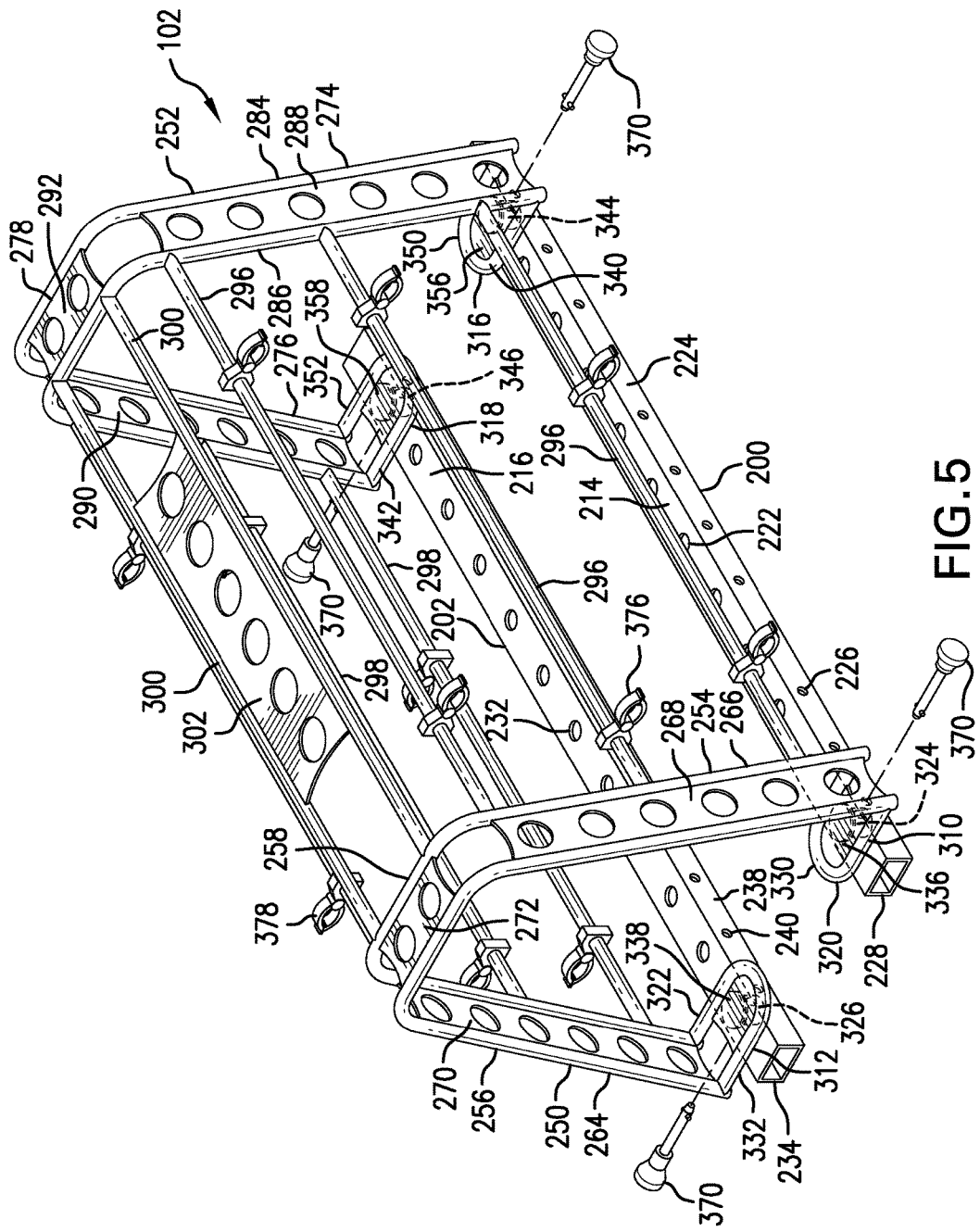
FIG. 5 is a side perspective view of the rack to be mounted to left and right frame rails of the vehicle.
Figure 6:
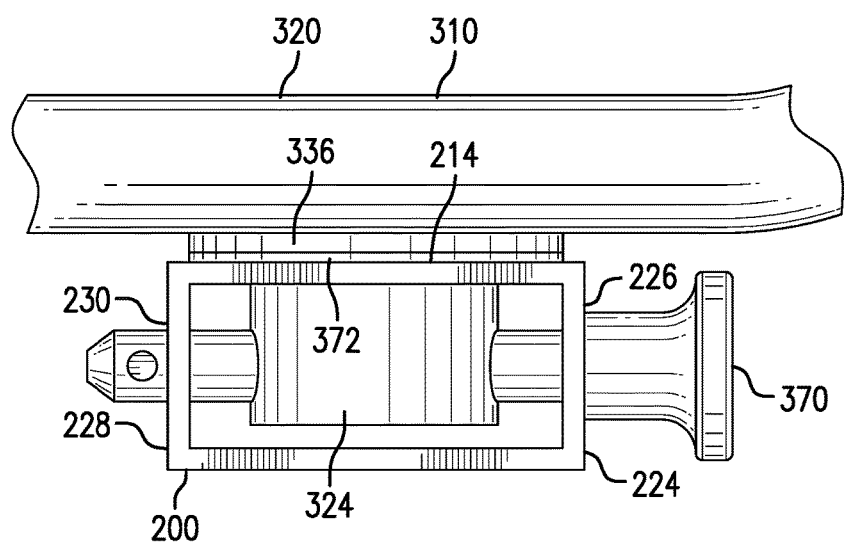
FIG. 6 is an enlarged view depicting the connection of the rack to one of the frame rails.

With reference to FIGS. 5 and 6, each of the left and right frame rails 200, 202 is horizontally disposed and has an upper mounting surface 214, 216. As shown, the left and right frame rails 200, 202 are rectangular shaped in cross-section taken along a lateral direction of the vehicle 100; although, this is not required. The upper surface 214 of the left frame rail 200 includes apertures 222, which can be equally spaced along a length of the left frame rail. The left frame rail 200 further includes an outer side surface 224 having apertures 226, and an inner side surface 228 which can have apertures 230 aligned with the apertures 226. Similarly, the upper surface 216 of the right frame rail 202 includes apertures 232, which can be equally spaced along a length of the right frame rail. The right frame rail 202 further includes an outer side surface 234 having apertures (not visible), and an inner side surface 238 which can have apertures 240 aligned with the outer side surface apertures. The exemplary rack 102 is mounted to the left and right frame rails 200, 202 above the left and right upper main frame members 110, 112. In the depicted embodiment, a lateral dimension of the rack 102 is greater than a spacing between the left and right frame rails 200, 202, and a length dimension of the rack 102 is approximately equal to a length dimension of the vehicle 100.

With continued reference to FIG. 5, the rack 102 includes a pair of frame members and a plurality of elongate rails disposed bridgingly between the frame members. The frame members may be configured as two parallel substantially vertically disposed frame members including a forward frame member 250 and a rear frame member 252. The forward and rear frame members 250, 252 may be disposed upon and removably secured to the left and right frame rails 200, 202 of the vehicle 100. The forward frame member 250 includes left and right forward uprights 254, 256 and a forward cross member 258 disposed bridgingly between the left and right forward uprights. Upper ends of the left and right forward uprights 254, 256 are generally inclined towards each other wherein a top of the forward frame member 250 is sized to be generally narrower than a bottom of the forward frame member 250. According to one aspect, the forward frame member 250 is defined by a pair of separate forward sub-frame members 264, 266 interconnected by forward plates 268, 270, 272, which increase stiffness and rigidity of the forward frame member 250. The forward sub-frame members 264, 266, which can be one-piece tubular members, are generally A-shaped such that a height dimension of each of the left and right forward uprights 254, 256 is greater than a lateral dimension of the forward cross member 258. The forward plates 268, 270 are provided as part of the left and right forward uprights 254, 256 and the forward plate 272 is provided as part of the forward cross member 258.

It should be appreciated that the rear frame member 252 can be configured similar to the forward frame member 250. Accordingly, the rear frame member 252 includes left and right rear uprights 274, 276 and a rear cross member 278 disposed bridgingly between the left and right rear uprights. Upper ends of the left and right rear uprights 274, 276 are generally inclined towards each other wherein a top of the rear frame member 252 is sized to be generally narrower than a bottom of the rear frame member 252. Again, the rear frame member 252 can be is defined by a pair of separate rear sub-frame members 284, 286 interconnected by rear plates 288, 290, 292, which increase stiffness and rigidity of the rear frame member 252. The rear sub-frame members 284, 286, which can be one-piece tubular members, are generally A-shaped such that a height dimension of the left and right rear uprights 274, 276 is greater than a lateral dimension of the rear cross member 278. The rear plates 288, 290 are provided as part of the left and right rear uprights 274, 276 and the rear plate 292 is provided as part of the rear cross member 278. A plurality of lightening holes may be formed in each forward plate 268, 270, 272 and in each rear plate 288, 290, 292 in order to reduce the overall weight of the rack 102.

The exemplary rack 102 further includes at least one left rail 296 extended in the longitudinal direction and disposed bridgingly between the left uprights 254, 274 of the respective forward and rear frame members 250, 252, and at least one right rail 298 extended in the longitudinal direction and disposed bridgingly between the right uprights 256, 276 of the respective forward and rear frame members 250, 252. As depicted, the rack 102 includes a pair of left rails 296 and a pair of right rails 298; although, it should be appreciated that the number of left and right rails 296, 298 provided on the rack 102 can depend on a desired use of the rack 102. Each of the left and right rails 296, 298 can be one-piece tubular members and is disposed to extend in a direction generally parallel to the left and right frame rails 200, 202. In addition, at least one top rail 300 extended in the longitudinal direction is disposed bridgingly between the forward and rear cross members 258, 278. In the illustrated aspect, a pair of top rails 300 is provided, and a top plate 302 interconnects the pair of top rails 300, which again increases stiffness and rigidity of the rack 102. End portions of the top plate 302 are spaced from the forward and rear cross members 258, 278, and a plurality of lightening holes may be formed in the top plate 302.

Various types of mounting mechanisms can be applied to mount the exemplary rack 102 to the left and right frame rails 200, 202. For example, as shown in FIGS. 5 and 6, the left and right forward uprights 254, 256 include respective left and right forward mounts 310, 312 each extended inwardly toward the other in the lateral direction of the vehicle 100. The left and right rear uprights 274, 276 also include respective left and right rear mounts 316, 318 each extended inwardly toward the other in the lateral direction. The forward and rear left mounts 310, 316 are connected to the left frame rail 200, and the forward and rear right mounts 312, 318 are connected to the right frame rail 202. According to one aspect, each of the left and right forward mounts 310, 312 includes an inwardly extending forward foot 320, 322 and a forward attachment member 324, 326 depending from the forward foot. Each forward foot 320, 322 can be defined by a horizontally disposed U-shaped frame 330, 332 having free end portions secured to the respective left and right forward uprights 254, 256 and a horizontally disposed plate 336, 338 secured to the U-shaped frame. The left and right forward attachment members 324, 326 depend from the respective plates 336, 338. Like the left and right forward mounts 310, 312, each of the left and right rear mounts 316, 318 includes an inwardly extending rear foot 340, 342 and a rear attachment member 344, 346 depending from the rear foot. Each rear foot 340, 342 can be defined by a horizontally disposed U-shaped frame 350, 352 having free end portions secured to the respective left and right rear uprights 274, 276 and a horizontally disposed plate 356, 358 secured to the U-shaped frame. The left and right rear attachment members 344, 346 depend from the respective plates 356, 358.

As indicated previously, the left frame rail 200 includes the upper surface 214 having apertures 222 and the right frame rail 202 includes the upper surface 216 having apertures 232. The apertures 222 of the left frame rail 200 receive the forward and rear left attachment members 324, 344 of the respective left forward and rear mounts 310, 316. The apertures 232 of the right frame rail 202 receive the forward and rear right attachment members 326, 346 of the respective right forward and rear mounts 312, 318. With the apertures 226 provided on the outer side surface 224 of the left frame rail 200 aligned with the apertures 222, when the forward and rear left attachment members 324, 344 are properly received in the apertures 222 the apertures 226 are also aligned with the forward and rear left attachment members 324, 344 of the respective left forward and rear mounts 310, 316. The apertures 226 receive associated fasteners (for example, the depicted quick release pins 370) which releasably engage the forward and rear left attachment members 324, 344. Similarly, with the apertures (not visible) provided on the outer side surface 234 of the right frame rail 202 aligned with the apertures 232, when the forward and rear right attachment members 326, 346 are properly received in the outer side surface apertures the outer side surface apertures are also aligned with the forward and rear right attachment members 326, 346 of the respective left forward and rear mounts 312, 318. Again, the outer side surface apertures of the right frame rail 202 receive associated fasteners (for example, the depicted quick release pins 370) which releasably engage the forward and rear right attachment members 326, 346. The quick release pins 370 can also be attached elsewhere on the left and right frame rails 200, 202 for mounting of associated vehicle accessories to the vehicle 100.

It should be appreciated that compressible members 372 (for example, neoprene washers) can be provided between the plates 336, 338, 356, 358 and the left and right frame rails 200, 202. Additionally, the exemplary rack 102 can include at least one left accessory holding device 376 mounted to the at least one left rail 296 and selectively movable along a length of the at least one left rail, and at least one right accessory holding device 378 mounted to the at least one right rail 298 and selectively movable along a length of the at least one right rail.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An autonomous all-terrain vehicle comprising:
 a frame structure;
 left and right frame rails extended in a longitudinal direction of the vehicle and mounted to the frame structure; and
 a rack extended in the longitudinal direction and releasably mounted to the left and right frame rails, the rack including:
  a forward frame member including left and right forward uprights and a forward cross member disposed bridgingly between the left and right forward uprights, the left and right forward uprights include respective left and right forward mounts each extended inwardly in a lateral direction of the vehicle;
  a rear frame member including left and right rear uprights and a rear cross member disposed bridgingly between the left and right rear uprights, the left and right rear uprights include respective left and right rear mounts each extended inwardly in the lateral direction;
  at least one left rail extended in the longitudinal direction, the at least one left rail disposed bridgingly between the left uprights of the respective forward and rear frame members; and
  at least one right rail extended in the longitudinal direction, the at least one right rail disposed bridgingly between the right uprights of the respective forward and rear frame members,
  wherein the forward and rear left mounts are connected to the left frame rail, and the forward and rear right mounts are connected to the right frame rail.

2. The vehicle of claim 1, wherein each of the left and right forward mounts includes an inwardly extending forward foot and a forward attachment member depending from the forward foot.

3. The vehicle of claim 2, wherein each forward foot of the left and right forward mounts is defined by a horizontally disposed U-shaped frame having free end portions secured to the respective left and right forward uprights and a horizontally disposed plate secured to the U-shaped frame, the forward attachment member depending from the plate.

4. The vehicle of claim 2, wherein each of the left and right rear mounts includes an inwardly extending rear foot and a rear attachment member depending from the rear foot.

5. The vehicle of claim 4, wherein each rear foot of the left and right rear mounts is defined by a horizontally disposed U-shaped frame having free end portions secured to the respective left and right rear uprights and a horizontally disposed plate secured to the U-shaped frame, the rear attachment member depending from the plate.

6. The vehicle of claim 4, wherein the left frame rail includes an upper surface having apertures which receive the forward and rear attachment members of the respective left forward and rear mounts; and
 the right frame rail includes an upper surface having apertures which receive the forward and rear attachment members of the respective right forward and rear mounts.

7. The vehicle of claim 6, wherein the left frame rail includes a side surface having apertures aligned with the forward and rear attachment members of the respective left forward and rear mounts, the apertures receiving associated fasteners which releasably engage the forward and rear attachment members.

8. The vehicle of claim 6, wherein the right frame rail includes a side surface having apertures aligned with the forward and rear attachment members of the respective right forward and rear mounts, the apertures receiving associated fasteners which releasably engage the forward and rear attachment members.

9. The vehicle of claim 1, wherein the frame structure includes:
 left and right laterally spaced upper main frame members extended in a longitudinal direction of the frame structure,
 left and right laterally spaced lower main frame members extended in the longitudinal direction and connected to the respective left and right upper main frame members,
 left and right forward platform mounting brackets mounted to one of the respective left and right upper main frame members and the respective left and right lower main frame members, and
 left and right rear platform mounting brackets mounted to one of the respective left and right upper main frame members and the respective left and right lower main frame members,
 wherein the left frame rail is mounted to the left forward and rear platform mounting brackets, and the right frame rail is mounted to the right forward and rear platform mounting brackets.

10. The vehicle according to claim 9, wherein the left and right frame rails are offset in both the lateral direction and a height direction of the vehicle from the respective left and right upper main frame members.

11. The vehicle according to claim 1, wherein lower end portions of the left and right forward uprights of the forward frame member and the left and right rear uprights of the rear frame member extend outward in the lateral direction of the respective left and right frame rails.

12. The vehicle according to claim 1, wherein the forward frame member is A-shaped with a height dimension of the left and right forward uprights greater than a lateral dimension of the forward cross member, and the rear frame member is A-shaped with a height dimension of the left and right rear uprights greater than a lateral dimension of the rear cross member.

13. The vehicle according to claim 1, wherein the rack further includes at least one left holding device mounted to the at least one left rail and selectively movable along a length of the at least one left rail, and at least one right holding device mounted to the at least one right rail and selectively movable along a length of the at least one right rail.

14. The vehicle according to claim 1, wherein a lateral dimension of the rack is greater than a spacing between the left and right frame rails, and a length dimension of the rack is approximately equal to a length dimension of the vehicle.

15. A rack releasably mounted to left and right frame rails secured to a frame structures of an autonomous all-terrain vehicle, the rack comprising:
- a forward frame member including left and right forward uprights and a forward cross member disposed bridgingly between the left and right forward uprights, wherein the forward frame member is defined by a pair of separate forward sub-frame members interconnected by at least one forward plate;
- a rear frame member including left and right rear uprights and a rear cross member disposed bridgingly between the left and right rear uprights, wherein the rear frame member is defined by a pair of separate rear sub-frame members interconnected by at least one rear plate;
- at least one left rail extended in the longitudinal direction, the at least one left rail disposed bridgingly between the left uprights of the respective forward and rear frame members;
- at least one right rail extended in the longitudinal direction, the at least one right rail disposed bridgingly between the right uprights of the respective forward and rear frame members;
- left and right forward mounts each extended inwardly in a lateral direction of the vehicle from the respective left and right forward uprights, each of the left and right forward mounts including a forward attachment member adapted for releasable connection to the respective left frame rail and right frame rail; and
- left and right rear mounts each extended inwardly in the lateral direction from the respective left and right rear uprights, each of the left and right rear mounts including a rear attachment member adapted for releasable connection to the respective left frame rail and right frame rail.

16. The rack of claim 15, wherein each of the left and right forward mounts includes an inwardly extending forward foot defined by a horizontally disposed U-shaped frame having free end portions secured to the respective left and right forward uprights and a horizontally disposed plate secured to the U-shaped frame, the forward attachment member depending from the horizontally disposed plate.

17. The rack of claim 15, wherein each of the left and right rear mounts includes an inwardly extending forward foot defined by a horizontally disposed U-shaped frame having free end portions secured to the respective left and right rear uprights and a horizontally disposed plate secured to the U-shaped frame, the rear attachment member depending from the horizontally disposed plate.

18. The rack according to claim 15, wherein the forward frame member is A-shaped with a height dimension of the left and right forward uprights greater than a lateral dimension of the forward cross member, and the rear frame member is A-shaped with a height dimension of the left and right rear uprights greater than a lateral dimension of the rear cross member.

19. The rack according to claim 15, further including at least one left holding device mounted to the at least one left rail and selectively movable along a length of the at least one left rail, and at least one right holding device mounted to the at least one right rail and selectively movable along a length of the at least one right rail.

20. An autonomous all-terrain vehicle comprising:
- a frame structure;
- left and right frame rails extended in a longitudinal direction of the vehicle and mounted to the frame structure; and
- a rack extended in the longitudinal direction and releasably mounted to the left and right frame rails, a lateral dimension of the rack being greater than a spacing between the left and right frame rails, the rack including:
  - a forward A-shaped frame member including left and right forward mounts each extended inwardly in a lateral direction of the vehicle;
  - a rear A-shaped frame member including left and right rear mounts each extended inwardly in the lateral direction; and
  - at least one left rail and at least one right rail each disposed bridgingly between the forward and rear frame members;
- wherein the left frame rail includes an upper surface having apertures which receive the left forward and rear mounts, and the right frame rail includes an upper surface having apertures which receive the right forward and rear mounts.

* * * * *